United States Patent
Stieger et al.

(10) Patent No.: US 8,549,991 B2
(45) Date of Patent: Oct. 8, 2013

(54) NOZZLE ADAPTABLE TO STEAM OUTLET OF A COFFEE MACHINE

(75) Inventors: Mischa Stieger, La Croix (CH); Alfred Yoakim, St-Legier-la Chiesaz (CH)

(73) Assignee: Nestec S.A., Vevey (CH)

( * ) Notice: Subject to any disclaimer, the term of this patent is extended or adjusted under 35 U.S.C. 154(b) by 2144 days.

(21) Appl. No.: 10/538,583

(22) PCT Filed: Dec. 15, 2003

(86) PCT No.: PCT/EP03/14228
§ 371 (c)(1),
(2), (4) Date: Jun. 15, 2005

(87) PCT Pub. No.: WO2004/054413
PCT Pub. Date: Jul. 1, 2004

(65) Prior Publication Data
US 2006/0113408 A1   Jun. 1, 2006

(30) Foreign Application Priority Data
Dec. 16, 2002   (EP) .................................. 02028234

(51) Int. Cl.
*B05B 1/00*   (2006.01)
*A47J 31/44*   (2006.01)
*A23L 2/54*   (2006.01)
*B01F 3/04*   (2006.01)

(52) U.S. Cl.
USPC ............................. 99/293; 99/323.1; 239/600

(58) Field of Classification Search
USPC ................... 99/323.1, 290–295; 239/600, 601
See application file for complete search history.

(56) References Cited

U.S. PATENT DOCUMENTS

| | | | | |
|---|---|---|---|---|
| 5,330,266 A | * | 7/1994 | Stubaus ........................ | 366/101 |
| 5,738,002 A | * | 4/1998 | Marano-Ducarne ............ | 99/293 |
| 5,768,975 A | * | 6/1998 | Wu .................................. | 99/290 |
| 5,768,981 A | * | 6/1998 | Cicchetti ........................ | 99/453 |
| 6,499,389 B1 | * | 12/2002 | Probst .......................... | 99/323.1 |

FOREIGN PATENT DOCUMENTS

| | | |
|---|---|---|
| EP | 0 801 922 | 10/1997 |
| WO | 00/16674 | 3/2000 |

* cited by examiner

*Primary Examiner* — Len Tran
*Assistant Examiner* — Justin Jonaitis
(74) *Attorney, Agent, or Firm* — K&L Gates LLP

(57) ABSTRACT

The invention concerns a nozzle (1) adaptable to the steam outlet of a coffee machine designed to froth a liquid, said nozzle is made in one single piece and comprises: an opening (3) for steam supply, a restriction (4) in the extension of said opening; and a flared zone (5) in the axis of said restriction and said opening providing an outlet for the liquid, having a cross-section substantially equal to the cross-section of the opening; and perpendicular to the opening a conduit (2) for supply of the liquid and an air inlet (40).

11 Claims, 5 Drawing Sheets

NOZZLE ADAPTABLE TO STEAM OUTLET OF A COFFEE MACHINE

FIELD OF THE INVENTION

The present invention relates to a nozzle that can be fitted onto the steam outlet of a coffee machine.

BACKGROUND OF THE INVENTION

Devices for emulsifying a mixture of steam, air and milk for making cappuccinos are known in the field of coffee machines. Patent application WO 00/16674 relates to such a device. The disadvantage with this system is that it is difficult to maintain good conditions of hygiene because of the use of milk which is a fatty liquid and adheres to said device and leads to smells and bacterial growth. It is therefore compulsory with this system, in order to ensure good conditions of hygiene when it is being used, to clean it regularly. It should also be noted that this system consists of a plurality of parts that have to be disassembled in order to clean them effectively. This therefore entails a loss of time as far as the user is concerned. U.S. Pat. No. 5,738,002 also relates to a device for emulsifying a mixture of steam, air and milk. As with the previous device, there are numerous parts for which regular cleaning has to be envisaged.

The object of the present invention is to develop a device that allows cappuccinos to be made without the abovementioned disadvantages. The general objective is either to have a device that is self-cleaning, or a device that is disposable, at least after one day of use. The present invention considers the latter alternative.

SUMMARY OF THE INVENTION

The present invention relates to a nozzle that can be fitted onto the steam outlet of a coffee machine intended to froth a liquid, said nozzle is made as a single piece and comprises
 a mouth for letting in the steam,
 a restriction in the continuation of said mouth,
 and a flared zone along the axis of said restriction and of said mouth to allow the liquid out, having a cross section more or less equal to the cross section of the mouth, and
 more or less perpendicular to the mouth, a pipe for letting in liquid and an air inlet.

As far as the air intake is concerned, there are various possible solutions. One of the solutions is for the air intake to be located on the liquid inlet pipe. For example, in the form of a hole or slit on said pipe. The second solution is for the air intake to consist of a pipe opening into the liquid inlet pipe more or less at right angles. The height of this pipe and its diameter are not critical. As a preference, the height of this pipe is greater than the height of the steam mouth. The inside diameter of the pipe is preferably equivalent to the inside diameter of the liquid inlet pipe.

As a preference, the liquid used is milk. The benefit of this system is that it is simple and therefore inexpensive, which makes it possible to use it for the day and then dispose of it after it has been used a few times, replacing it with a new nozzle the next day.

The nozzle is positioned on the steam outlet of the machine and is ready for use as will be explained hereinbelow. A tube for drawing up said liquid is placed on the liquid inlet pipe. This tube is intended to dip down into the liquid that is to be frothed. This tube is preferably a simple straw, of a length that allows it to reach the container holding the liquid. When a cappuccino is to be prepared, the straw is immersed in the milk and the steam arriving via the mouth of the nozzle creates a depression in said mouth, and this creates a phenomenon of drawing the milk into said straw.

The flared zone of the nozzle comprises a means for breaking or bursting the jet. This means preferably has the form of a circumflex accent, but may also be any means that burst the jet open. The function of this means is to prevent the jet from arriving at the outlet directly, in order to channel said jet correctly, so that it leaves the nozzle without creating splashing.

The flared zone narrows toward the liquid outlet and comprises a stabilizing zone. This stabilizing zone is in the form of a cylindrical part of a certain height in said flared zone.

The nozzle according to the invention can be made of any material. As a preference, it is made of a plastic compatible with food use. The part is preferably injection-molded, for example in polypropylene. However, it would also be possible to envisage a nozzle made of stainless steel or some other metal. It is important according to the invention for the nozzle to be made as a single piece, on the one hand for cost reasons, and on the other hand, to prevent said part from having regions that could potentially form hiding places where milk might be deposited. This would nonetheless make it possible to use said nozzle for a day without any risk of bacterial contamination.

In a preferred embodiment, for commercial coffee machines, consideration is given to a liquid inlet pipe having an inside diameter of the order of 1 to 3 mm and a steam inlet mouth having an inside diameter of the order of 10 to 15 mm.

In this embodiment, the restriction zone and the stabilizing zone have an inside diameter of the order of 2 to 4 mm. The cylindrical part of the stabilizing zone has a height of about 4 to 20 mm. As a preference, the diameter is 3 mm and the height is 9 to 12 mm.

Of course, the dimensions given hereinabove can vary according to the machine and the steam output considered.

Additional features and advantages of the present invention are described in, and will be apparent from, the following Detailed Description of the Invention and the figures.

BRIEF DESCRIPTION OF THE FIGURES

The remainder of the description is given with reference to the drawings, in which.

DETAILED DESCRIPTION OF THE INVENTION

Figure 1:
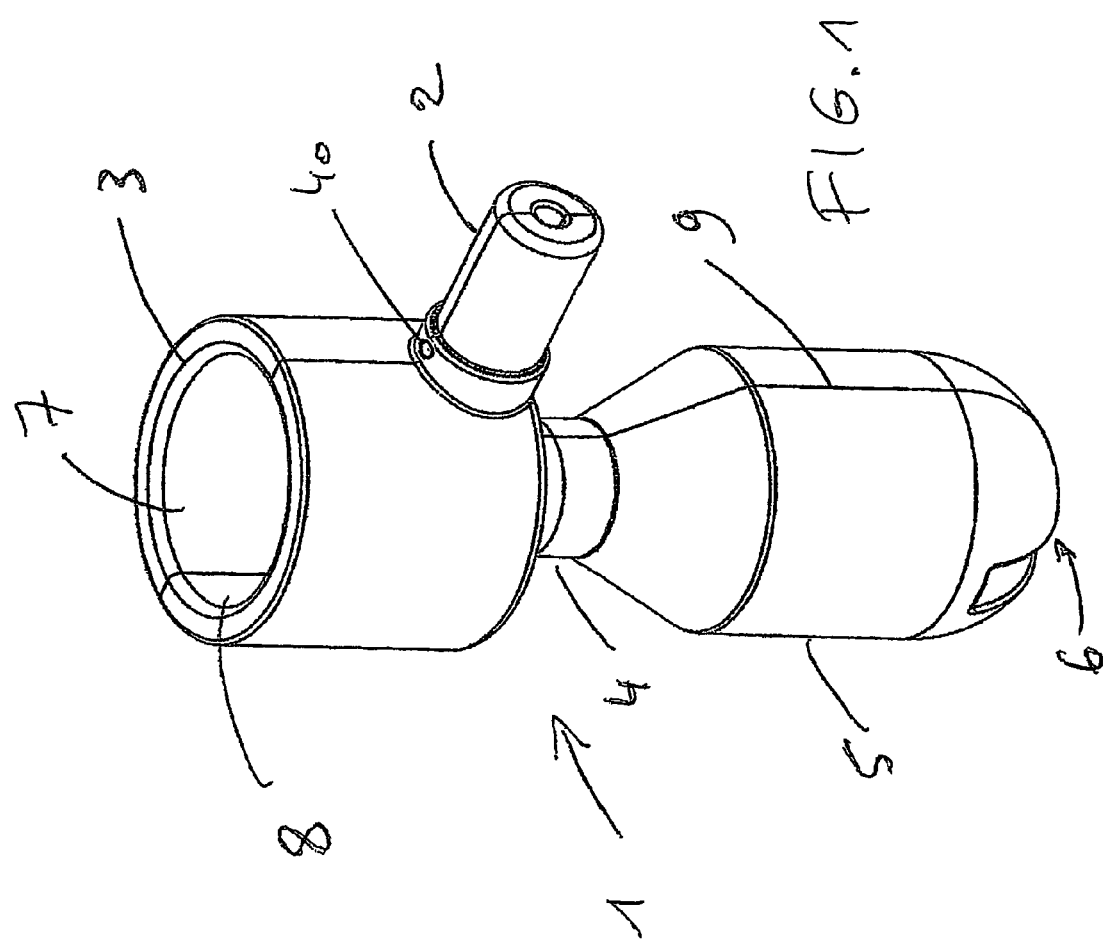
FIG. 1 is a perspective depiction of the nozzle according to the invention.

The nozzle (1) according to the invention comprises a pipe (2) for letting the liquid in and an air inlet (40), a mouth (3) for letting in the steam, a restriction (4) and a flared zone (5) allowing the liquid out at (6). It can be seen clearly in the figure that the nozzle is formed of two shells (7, 8): these two shells are manufactured by injection molding and are welded together ultrasonically, for example, or by any other welding means known in the art, along the line (9). It is also possible for the two shells to fold in on one another so as to guarantee a good seal, according to means known in the art.

Figure 2:
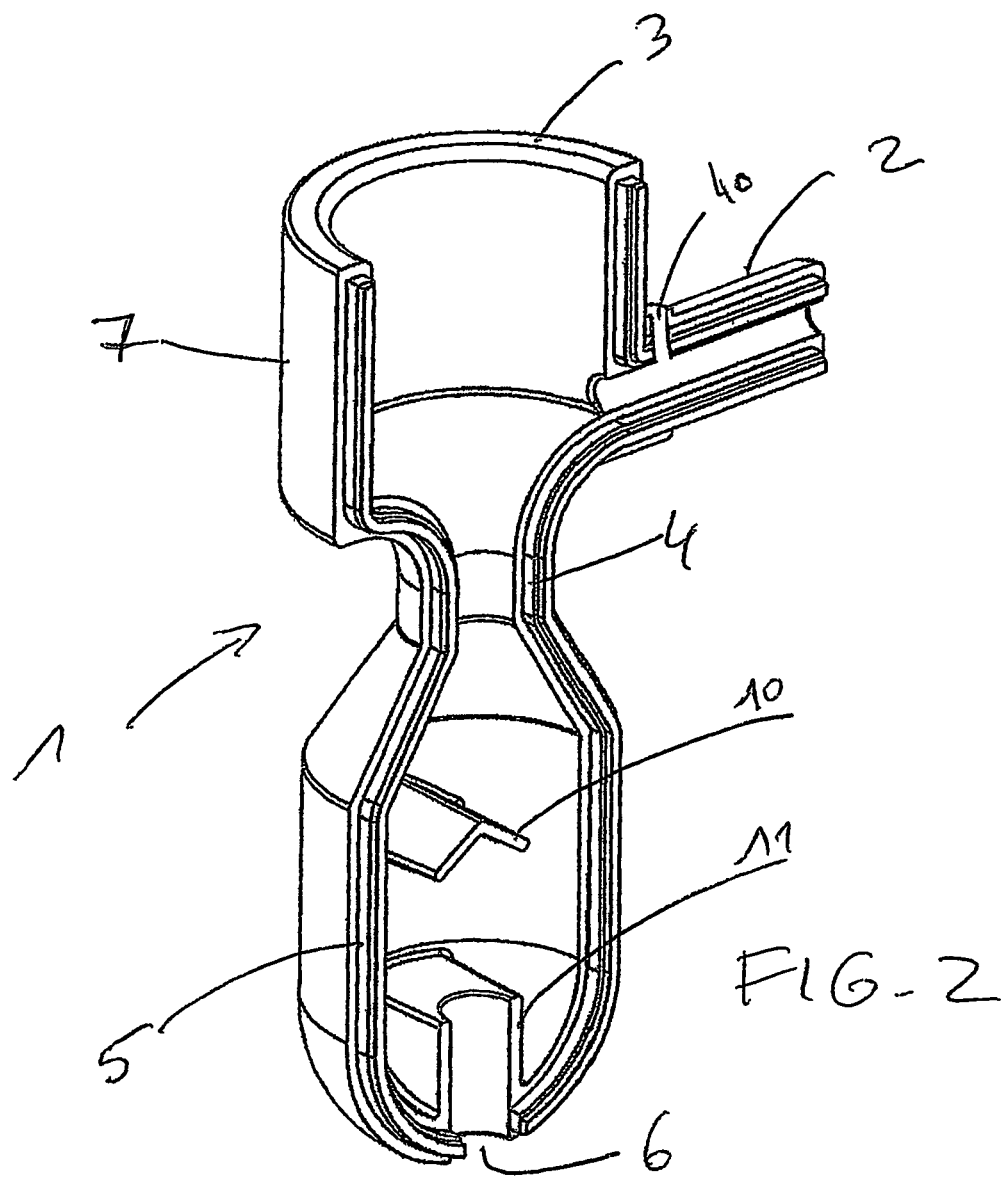
FIG. 2 is a perspective depiction of the nozzle opened up.

FIG. 2 gives a better appreciation of the inside of the nozzle. The elements that are the same in FIG. 1 have been given the same references. This figure clearly shows the means (10) for breaking the jet of liquid and the stabilization zone (11) having the cylindrical shape with a height of between 5 and 8 mm. The overall height of the nozzle in this embodiment is about 40 mm.

Figure 3:
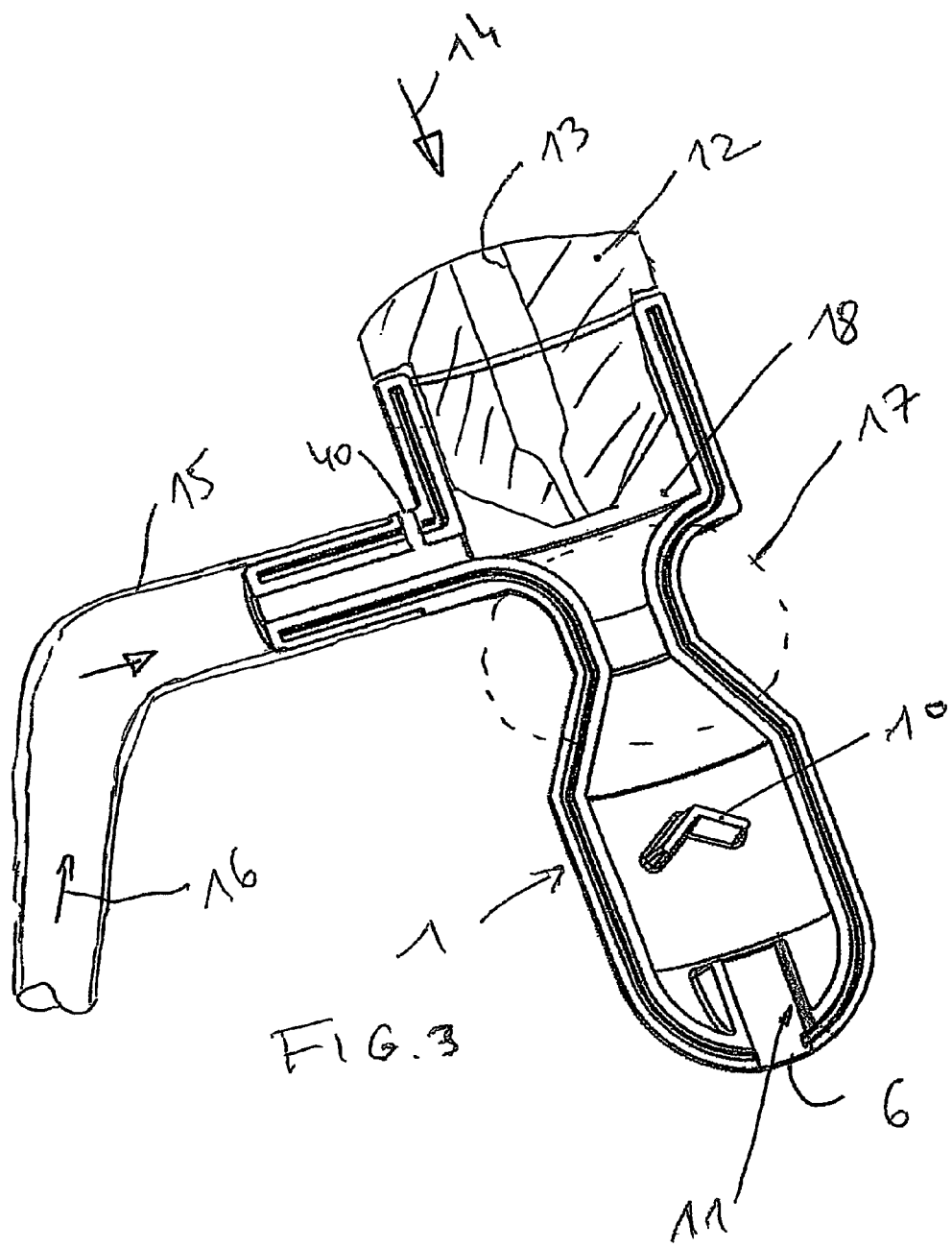
FIG. 3 is a depiction of the nozzle opened up in order to explain its operation.

FIG. 3 gives an understanding of the use of the nozzle according to the invention. The nozzle (1) is arranged on the steam outlet (12) of a coffee machine. A straw (15) is then placed on the pipe (2). When a cappuccino is to be made, the steam arrives in the direction of the arrow (14) in the pipe (13) and creates a depression in the zone (18), and this has the effect of causing the milk to be drawn up in the direction (16) into the straw towards the nozzle according to the invention. The froth is formed in the zone (17), the jet is broken by the element (10) and the frothed milk leaves via the outlet (6). The nozzle is able to achieve 100% frothing and the milk leaves at a temperature of about 60° C.

Figure 4:
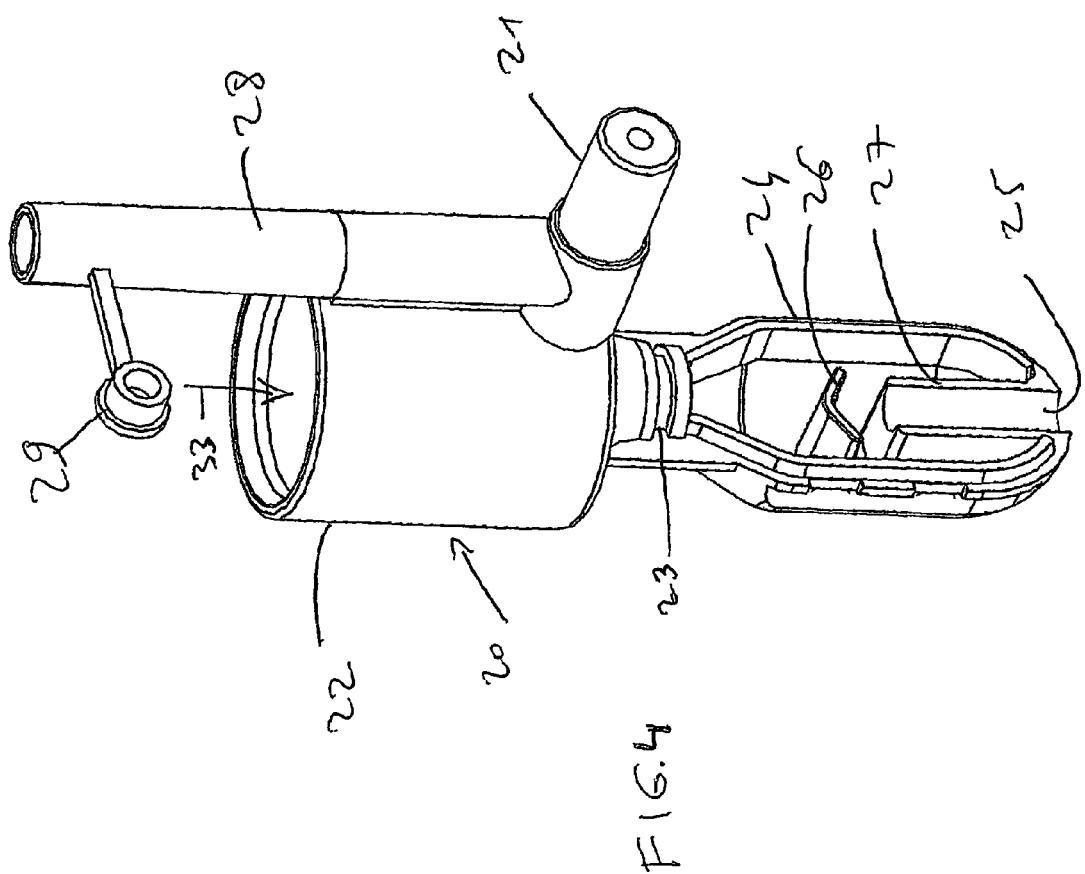
FIG. 4 is a perspective depiction of the nozzle opened up in a second embodiment.
Figure 5:
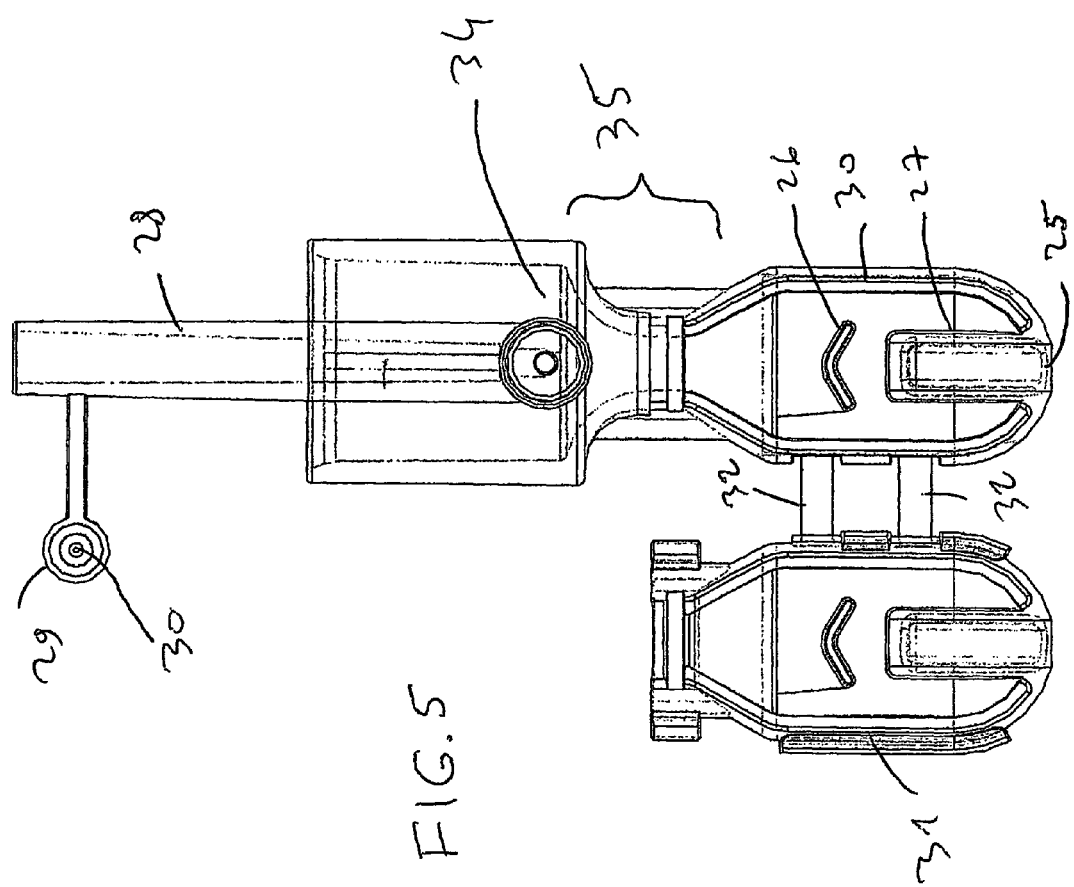
FIG. 5 is a perspective depiction of the nozzle of FIG. 4, in order to clearly show that it is made as a single piece.

The nozzle (20) in the second embodiment of FIGS. 4 and 5 comprises a pipe (21) for letting in liquid, a mouth (22) for letting in steam, a restriction (23) and a flared zone (24) allowing the liquid out at (25). FIG. 5 clearly shows that the nozzle is formed of two shells (30, 31). The means (26) allows the jet of liquid to be broken and the stabilizing zone (27) having a cylindrical shape allows a stabilized outlet of the jet of liquid. By comparison with the previous version, the nozzle also comprises a pipe (28) allowing air to be taken into the pipe (21). This pipe (28) comprises a stopper (29) with an opening (30) to allow air to be taken in. In use, the stopper is placed on the pipe (28). It can be clearly seen in FIG. 5 that the nozzle is made as a single piece and that the two shells (30, 31) are connected by two ties (32). When the nozzle is to be used, all that is required is for the shell (31) to be folded down onto the shell (30): the known jointing system guarantees that the nozzle forms a good seal.

The method of operation is similar to that of the preceding figures. The nozzle (20) is arranged via the mouth (22) on the steam outlet (not depicted) of a coffee machine. A straw (not depicted) is then placed on the pipe (21). When a cappuccino is to be made, the steam arrives in the direction of the arrow (33) and creates a depression in the zone (34) and this has the effect of causing the milk to rise up inside the straw toward the nozzle according to the invention. The froth is formed in the zone (35), the jet is broken by the element (26) and the frothed milk leaves via the outlet (25). The nozzle is able to achieve 100% frothing and the milk leaves at a temperature of about 60° C.

The benefit of this nozzle is that it is inexpensive: it can therefore be disposed of once it has been used a few times through the day. It is made of a single piece and is compatible with all commercially available straws. The risk of contamination is low, as it is not washed.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A nozzle that can be fitted onto a steam outlet of a coffee machine intended to froth a liquid, the nozzle comprising:
two injection-molded plastic shell bodies connected by a welded to form a one a piece structure, wherein the bodies are mirrored halves such that when they are welded together the nozzle comprises:
a mouth for receiving the steam,
a restriction in a continuation of the mouth,
a flared zone along an axis of the restriction and of the mouth to allow the liquid out, having a cross section approximately equal to the cross section of the mouth,
an inlet pipe approximately perpendicular to the mouth for allowing in liquid, and
an air intake formed directly on the inlet pipe as a hole, a slit or a pipe which opens into the inlet pipe, wherein the nozzle is disposable and compatible with food use.

2. The nozzle as claimed in claim 1, wherein the air intake comprises a pipe which opens into the inlet pipe at approximately right angles.

3. The nozzle as claimed in claim 1, wherein the pipe allows a tube to be fitted for drawing up said liquid.

4. The nozzle as claimed in claim 1, wherein the flared zone comprises a means for breaking a jet of liquid.

5. The nozzle as claimed in claim 1, wherein the flared zone comprises a stabilizing zone at its outlet.

6. The nozzle as claimed in claim 1, wherein the nozzle is injection-molded from a plastic compatible with food use.

7. The nozzle as claimed in claim 1, wherein the air intake and the inlet pipe have an inside diameter of 1 to 3 mm and the mouth has an inside diameter of 10 to 15 mm.

8. The nozzle as claimed in claim 1, wherein the restriction and the stabilizing zone have a diameter of 2 to 4 mm.

9. The nozzle as claimed in claim 1, wherein the stabilizing zone is a cylindrical part about 4 to 20 mm high.

10. A nozzle for a steam outlet of a coffee machine comprising:
two injection-molded plastic shell bodies connected by a welded to form a one a piece structure, wherein the bodies are mirrored halves such that when they are welded together the nozzle comprises:
a mouth for receiving the steam,
a restriction in the mouth,
a flared zone along an axis of the restriction and of the mouth, the flared zone having a cross section approximately equal to the cross section of the mouth,
an inlet pipe extending at an angle from the mouth for allowing in liquid, and
an air intake formed directly on the inlet pipe as a hole, a slit, or a pipe which opens into the inlet pipe, wherein the nozzle is disposable and compatible with food use.

11. The nozzle of claim 1, wherein the shells are made of propylene.

* * * * *